United States Patent
Malaby (10) Patent No.: US 8,321,892 B1
(45) Date of Patent: Nov. 27, 2012

(54) METHOD AND APPARATUS FOR FILTERING DATA DISPLAYED IN AN ELECTRONIC TELEVISION PROGRAM GUIDE

(75) Inventor: Stephen Malaby, Wayne, PA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3261 days.

(21) Appl. No.: 10/101,799

(22) Filed: Mar. 20, 2002

(51) Int. Cl.
*H04N 5/445* (2011.01)

(52) U.S. Cl. .......................... 725/49; 725/132; 348/734

(58) Field of Classification Search .............. 725/39–61, 725/68, 131–134, 139–142; 348/734, 906
See application file for complete search history.

(56) References Cited

U.S. PATENT DOCUMENTS

| | | | | |
|---|---|---|---|---|
| 5,585,865 A * | 12/1996 | Amano et al. | | 725/14 |
| 5,886,746 A * | 3/1999 | Yuen et al. | | 348/564 |
| 6,128,009 A * | 10/2000 | Ohkura et al. | | 725/46 |
| 6,317,883 B2 * | 11/2001 | Marics | | 725/56 |
| 6,481,010 B2 * | 11/2002 | Nishikawa et al. | | 725/44 |
| 6,493,688 B1 * | 12/2002 | Bakker et al. | | 706/20 |
| 6,874,152 B2 * | 3/2005 | Vermeire et al. | | 719/330 |
| 2002/0093449 A1 * | 7/2002 | Lin | | 341/176 |
| 2005/0157217 A1 * | 7/2005 | Hendricks | | 348/734 |

* cited by examiner

*Primary Examiner* — Annan Shang (57) ABSTRACT

The apparatus and method of the present invention provides a system for reducing the amount of information displayed in an on-screen television program guide. The user selects a genre by pressing a genre labeled button on a remote control. The remote control transmits an infrared signal to a set top box. The set top box then filters program guide data received from a satellite dish according to the selected genre and displays only channels and/or shows associated with the selected genre.

16 Claims, 6 Drawing Sheets

METHOD AND APPARATUS FOR FILTERING DATA DISPLAYED IN AN ELECTRONIC TELEVISION PROGRAM GUIDE

TECHNICAL FIELD OF THE INVENTION

The present invention relates in general to a method and apparatus for selecting and displaying information in an electronic program guide and in particular to determining which of several possible programs and/or stations to display in the program guide based on a single remote control selection in order to exclude undesired content from the guide.

BACKGROUND OF THE INVENTION

As satellite and cable television systems offer viewers more and more channels of programming from which to choose, the difficulty associated with selecting a channel increases. Some systems attempt to ease the viewer's burden by allowing him or her to predesignate certain "favorite" channels. However, this solution is inadequate for at least two reasons. First, the user must follow a procedure to designate which channels are to be included in the favorites list. This procedure is often complicated and avoided by many users who shy away from user manuals. Second, this solution forces a user to select his favorite channels ahead of time. Typically, the user selects channels which are likely to show programming he is interested in based on the type of programming this channel has shown in the past. However, these selections often turn out to be inaccurate for any given time period of programming. For example, if a user includes NBC in his or her favorites list, because that user enjoys the movies NBC shows each evening, the user may be disappointed when viewing his or her favorite channels during the day when NBC typically shows soap operas.

Some television systems allow the user to view an electronic program guide on the screen of the television. By navigating through the electronic program guide using a remote control, the user may select a program he or she is interested in viewing. However, in some systems with numerous channels, the user is presented with a large list of programs from which to choose, making the process of selecting a channel burdensome.

Some systems which provide an electronic program guide further include a filtering mechanism by which the user may reduce the number of channels listed in the electronic program guide. By reducing the number of channels displayed, the user's burden of selecting a channel is reduced. However, these systems require the user to navigate through an on-screen menu system each time he or she wishes to filter the electronic program guide. Navigating through an on-screen menu system is time consuming and complicated. In fact, many users never learn how to invoke the filtering feature. Other users avoid the filter feature because it takes too long to invoke the command

SUMMARY OF THE INVENTION

The present invention is directed to a direct-to-home integrated receiver/decoder (IRD) and a program for determining which of several possible programs and/or stations to display in an electronic program guide based on a single remote control selection in order to exclude undesired content from the guide.

In one aspect, the invention is directed to a method for filtering data displayed in an electronic television program guide. The method begins by detecting the depression of a key on a keypad associated with a television remote control unit. The remote control unit then transmits an infrared signal indicative of the key press to an integrated receiver/decoder associated with a direct-to-home satellite television system. In response, the integrated receiver/decoder determines if the key press is associated with a genre key. A genre key is a key on the television remote control unit labeled with a genre identifier. If the key press is associated with a genre key, the integrated receiver/decoder determines a genre filter code based on the infrared signal indicative of the key press. Subsequently, the integrated receiver/decoder filters electronic program guide data based on the genre filter code and displays the filtered electronic program guide data on a television screen.

In one embodiment, the step of determining if the key press is associated with a genre key includes the step of determining if an entry associated with the infrared signal is located in a look up table which may be stored in a memory associated with the integrated receiver/decoder. In a preferred embodiment, genre keys on the remote control are labeled with descriptive words, such as news, variety, music, family, living, movies, sports, Spanish, audio, cinema, etc. In some embodiments, the step of determining a genre filter code includes retrieving the genre filter code from a look up table. In one embodiment, the step of filtering electronic program guide data includes comparing the genre filter code to header information associated with a packet of electronic program guide data received by the integrated receiver/decoder from a satellite.

In another aspect, an apparatus for filtering data displayed in an electronic television program guide in a direct-to-home satellite television system is provided. The apparatus comprises an infrared receiver for receiving an infrared signal from a television remote control unit. Preferably, the infrared signal is indicative of a key press on a keypad associated with the television remote control unit. The apparatus further comprises a controller adapted to identify the infrared signal as being associated with a genre key. The controller is preferably further adapted to determine a genre filter code based on the infrared signal and to filter electronic program guide data received from a direct-to-home television satellite based on the determined genre filter code. Still further, the apparatus comprises an output driver which generates a video signal to produce the electronic program guide on a television monitor.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

DETAILED DESCRIPTION OF THE PREFERRED EMBODIMENTS

Although the following description focuses on satellite broadcasts and electronic program guides, persons of ordinary skill in the art will readily appreciate that the techniques of the present invention are in no way limited to satellite broadcasts or electronic program guides. To the contrary, any system which might benefit from a determination of which of several possible programs and/or stations to display in an electronic program guide based on a single remote control selection may employ the techniques shown herein.

In general, television signal distribution systems rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

Typically, such systems include a receiver for receiving and processing transmitted waveforms. One type of receiver is part of a "wireless digital television" system utilized by the DIRECTV® broadcast service. It and similar systems allow consumers to receive directly in their homes over 175 television channels broadcast from geosynchronous satellites. The receiver includes a small (e.g., 18-inch) satellite antenna (e.g., reflective dish and LNB) connected by a cable to an integrated receiver/decoder unit (IRD). The satellite antenna is aimed toward one or more satellites, and the IRD is connected to the user's television in a similar fashion to a conventional cable-TV decoder.

On the transmission side, video, audio, and related information data signals are digitally encoded into a packetized data stream using a number of known algorithms. The encoded data stream may be compressed to reduce bandwidth requirements, modified to include convolutional error correction codes, modulated to Ku-band frequency, transmitted to the satellite, and relayed from the satellite to the satellite antenna. The LNB (low noise block) of the satellite antenna shifts the Ku-band signal down to an L-band signal which is transmitted through the cable to the IRD.

In the IRD, front-end circuitry receives the L-band signal and converts it to the original digital data stream of video, audio, electronic program guide (EPG) data, filtering information, and other control and information signals. The digital data stream is fed to video/audio decoder circuits which perform the main video/audio processing functions such as demultiplexing and decompression. EPG data, filtering information, and other control and information signals are sent to a micro-controller. The micro-controller controls the overall operation of the IRD, including selecting parameters, setting up and controlling hardware/software components, channel selecting, providing viewer access to different programming packages, blocking certain channels, filtering EPG data, displaying EPG data, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decompress the received compressed video/audio. However, the transmitting, receiving and decoding operations described herein may be performed in any other desired manner.

Figure 1:
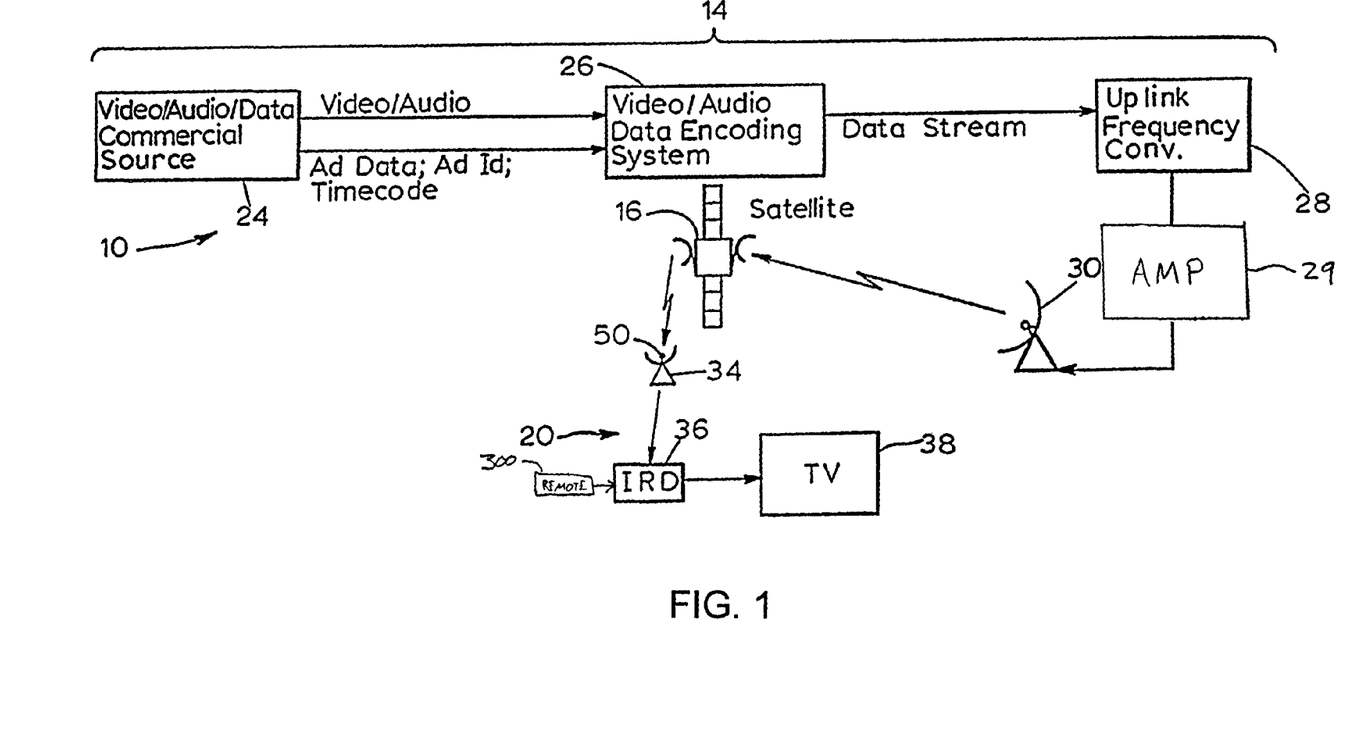
FIG. 1 is a block diagram of one embodiment of a direct broadcast satellite system.

FIG. 1 is a block diagram of a transmission and reception system 10 which may be the program guide system described below. The system 10 includes a transmission station 14, a relay 16, and a plurality of receiver stations, one of which is shown at reference numeral 20. A wireless over-the-air link provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and a television monitor 38 (or other output device) connected to the receiver unit 36. Preferably, the receiver unit 36 may be given user directed commands via, for example, an infrared signal transmitted by a remote control unit 300.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated and encoded data stream (including video, audio, EPG data, filtering information, and other control and information signals) is then routed from the uplink frequency converter 28, through an amplifier 29, to an uplink satellite antenna 30 where the data stream is broadcast toward the satellite 16 over the wireless link. The satellite 16 receives the modulated and encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
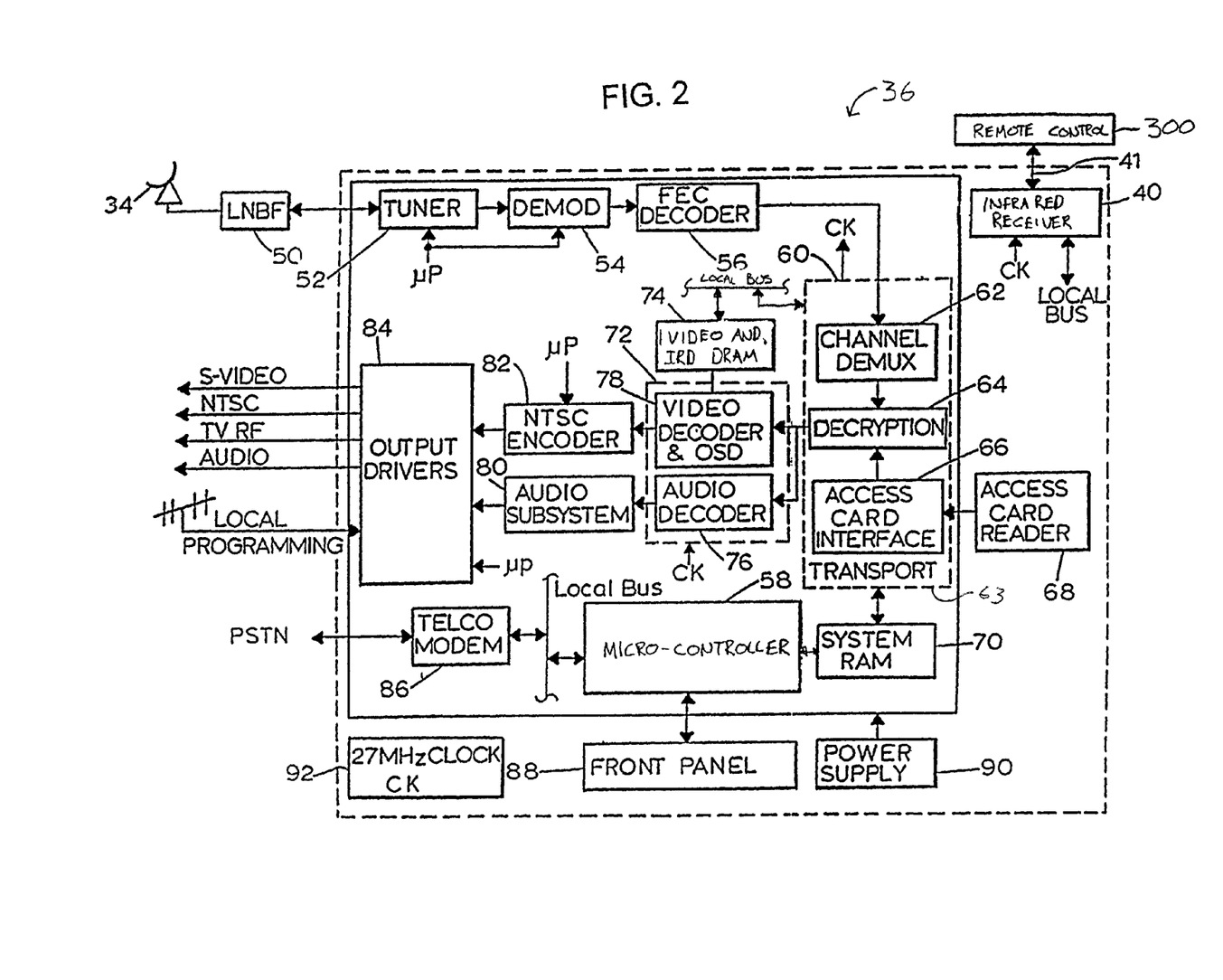
FIG. 2 is a block diagram illustrating more details of the receiver station of FIG. 1.

FIG. 2 is a more detailed block diagram of a portion of the receiver unit 36 shown in FIG. 1. The receiver unit 36 includes a tuner 52, demodulator 54, FEC decoder 56, the micro-controller 58, a transport circuit 60, a channel demultiplexer 62, decryption circuit 64, an access card interface 66, an access card reader 68, a memory device 70, an audio/video decoder circuit 72 having a dynamic random-access-memory (DRAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated.

Generally, front-end circuitry 52, 54 inside the receiver unit 36 receives the L-band RF signals from the LNB 50 and converts them back into the original digital data stream. Decoding circuitry 56, 63, 72 receives the original data stream and performs video/audio processing operations such as demultiplexing and decompression. The micro-controller 58 controls the overall operation of the receiver unit 36, including selection of parameters, set-up and control of components, channel selection, and many other functions. Persons of ordinary skill in the art will readily appreciate that the micro-controller 58 may be a microprocessor with supporting circuitry, a CPU, an ASIC, or any other type of controller. An infrared receiver 40 receives infrared signals transmitted by a remote control unit 300 (described in detail below) and then conveys the signals to the micro-controller 58 via a local bus. The DRAM 74 may be used for both video buffering and IRD functions such as IRD applications and administrative functions as is well known to persons of ordinary skill in the art. The memory device 70 may be another DRAM or a ROM for IRD functions. Of course, persons of ordinary skill in the art will readily appreciate that any number of different memory devices (including a single memory device) may be used to buffer video signals and/or store IRD applications. The DRAM 74 and/or any other memory devices 70 may communicate information, such as EPG data, to the micro-controller 58 directly and/or via a local bus. The output drivers 84 generate video and audio signals for the television monitor 38. A 27 MHZ clock signal generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. As is known, the digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest, which now consists of the payload portions of the received data packets, is forwarded to decoder DRAM 74 for buffering and may optionally be intermediately stored in the memory device 70. The audio/video decoder 72 decodes the payloads stored in DRAM 74, as needed. The requested data is routed from the memory device 70 through the transport 60 to the audio/video decoder 72. At that time, the data is routed to the video decoder 78 (which includes display generating circuitry) and to the NTSC (or other) encoder 64. The video decoder 78 reads in the compressed video data from the DRAM 74, parses this data, creates quantized frequency domain coefficients, and then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in the DRAM 74 and is passed through display circuitry (located in the video decoder 78) to the encoder 82. The display circuitry generates the graphics that allow text such as the electronic program guide data to be displayed. As is well known, the encoder 78 converts the digital video signals to analog according to the NTSC standard or to other desired output protocols (e.g., ATSC), thereby allowing video to be received by a conventional television 38 or other video output device (FIG. 1).

In order to aide the user in navigating the content available on such a system, an electronic television program guide may be generated. Preferably, content records are transmitted within the data stream to describe the available content and to allow the local receiver unit (IRD) 36 to build the program guide. In the preferred embodiment, the program guide is adapted to exclude content that is currently not desired by the user based on a genre selection made by the user by pressing a key on a remote control unit. For example, if the user presses a "movie" button, channels currently not showing a movie are preferably excluded from the program guide to reduce frustration on the part of the user.

Figure 3:
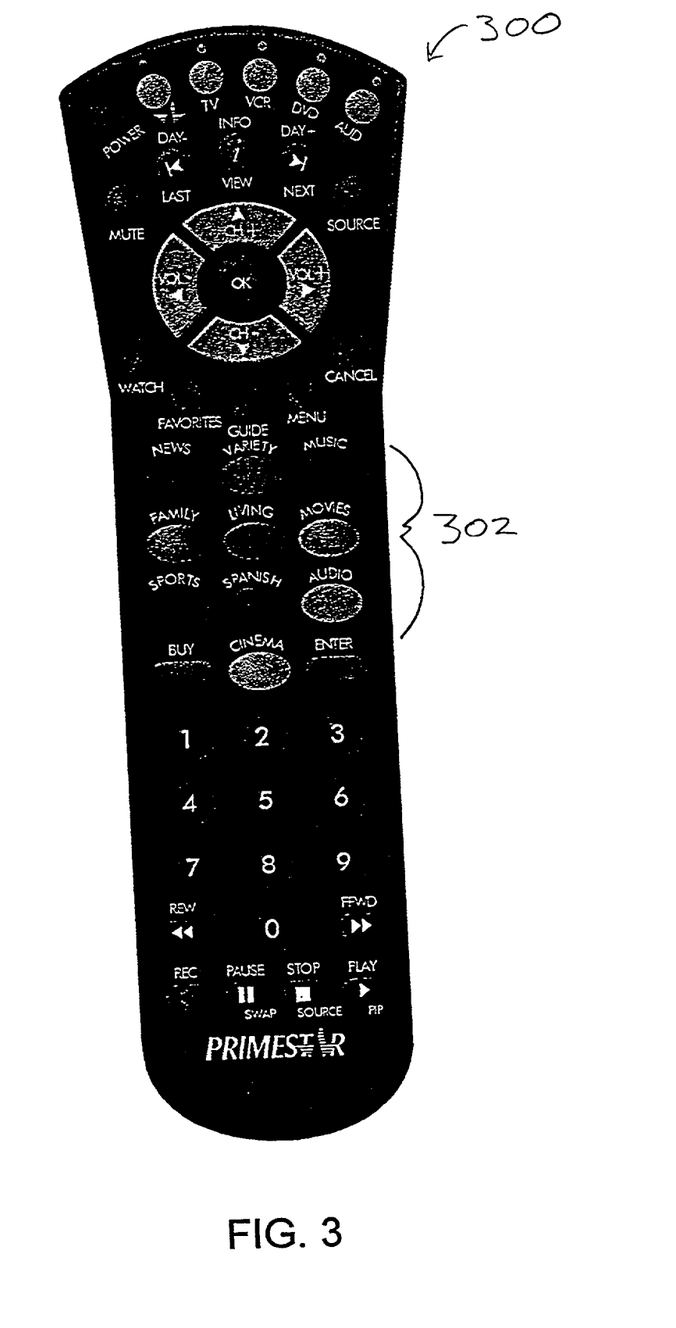
FIG. 3 is a detailed illustration of the remote control unit of FIG. 1.

One such remote control unit 300 is illustrated in FIG. 3. In this example, ten genre keys 302 labeled "NEWS", "VARIETY", "MUSIC", "FAMILY", "LIVING", "MOVIES", "SPORTS", "SPANISH", "AUDIO", and "CINEMA" are available for selection. Of course, genre keys could be used instead of or in addition to the keys illustrated in FIG. 3. When a genre key 302 on the remote control unit 300 is pressed, the remote control unit 300 transmits an infrared signal to the IRD 36. The signal is coded to indicate which key was pressed. Subsequently, the IRD 36 decodes the infrared signal and identifies the key press as being associated with a genre key 302. The IRD 36 then uses the code associated with the received infrared signal to determine a genre filter code and displays a filtered electronic program guide on the television screen.

Figure 4:
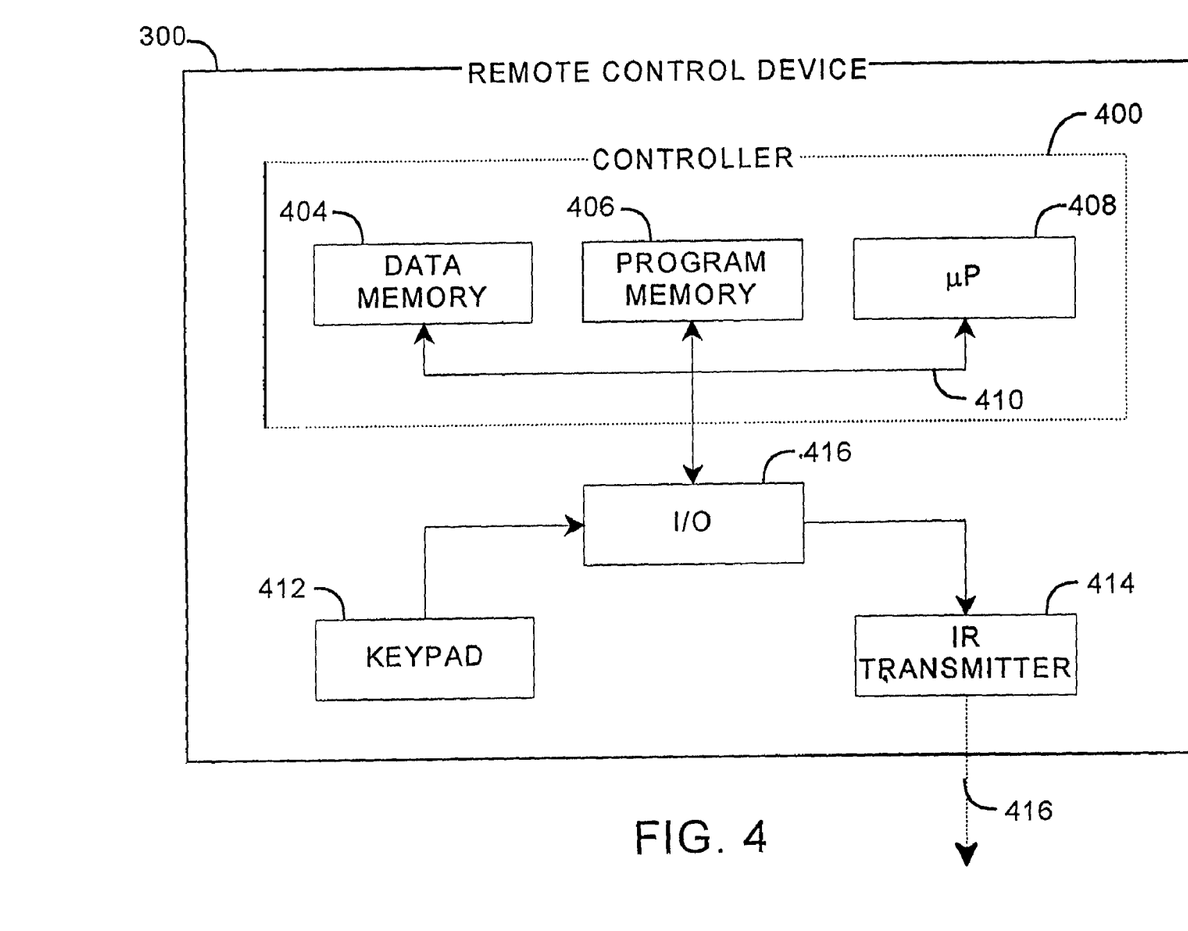
FIG. 4 is a detailed block diagram of the remote control unit of FIG. 3.

A block diagram of the remote control device 300 capable of being used to send program guide signals is illustrated in FIG. 4. In the preferred embodiment, the remote control device 300 is a application specific infrared transmitter. However, the remote control device 300 may be a general purpose computing device, such as a personal digital assistant or universal remote control. A controller 400 in the remote control device 300 may include a data memory 404, such as a random-access memory, a program memory 406, which may be in the form of a read-only memory (ROM), and a microprocessor 408, all of which may be interconnected by an address/data bus 410. In one embodiment, the program memory 406 electronically stores a computer program that implements all or part of the method described below, and the program is executed by the microprocessor 408. The program memory 406 may be loaded from a fixed memory device such as a PCMCIA card, or the program memory 106 may be preloaded with firmware as is well known to persons of ordinary skill in the art. Some of the steps described in the method below may be performed manually or without the use of the remote control device 300.

Preferably, a keypad 412 and an infrared transmitter 414 are electronically coupled to the controller 400 via a conventional input/output (I/O) circuit 415. The controller 400 receives key press signals from the keypad 412. In response to certain keypad signals, the controller 400 causes the infrared transmitter 414 to transmit a coded infrared signal 416. Preferably the code associated with the coded infrared signal 416 is indicative of the key pressed. Subsequently, the IRD 36 decodes the infrared signal and identifies the key press as being associated with a genre key 302. The IRD 36 then uses the code associated with the received infrared signal to determine a genre filter code and to display a filtered electronic program guide on the television screen.

Figure 5:
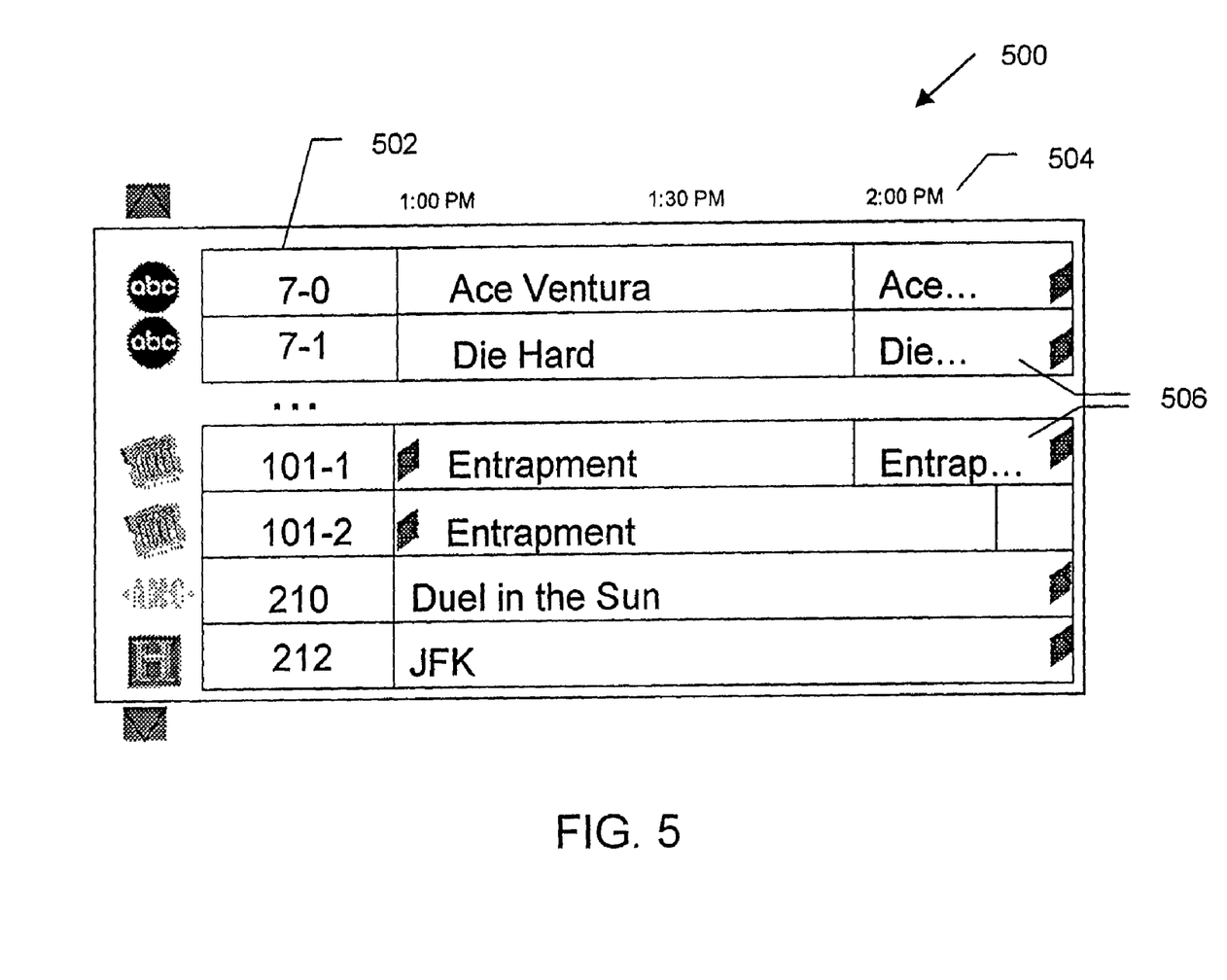
FIG. 5 is a block diagram illustrating an exemplary electronic program guide.

An example of a filtered electronic program guide 500 is illustrated in FIG. 5. Typically, channel numbers 502 are listed in numeric order vertically, and program times 504 are listed in chronological order horizontally. The grid boxes 506 in the body of the program guide 500 are preferably filled with text and/or graphics representing television shows and/or other programming available at the associated time 504 on the associated channel 502. In this example, only channels currently showing movies are displayed.

Figure 6:
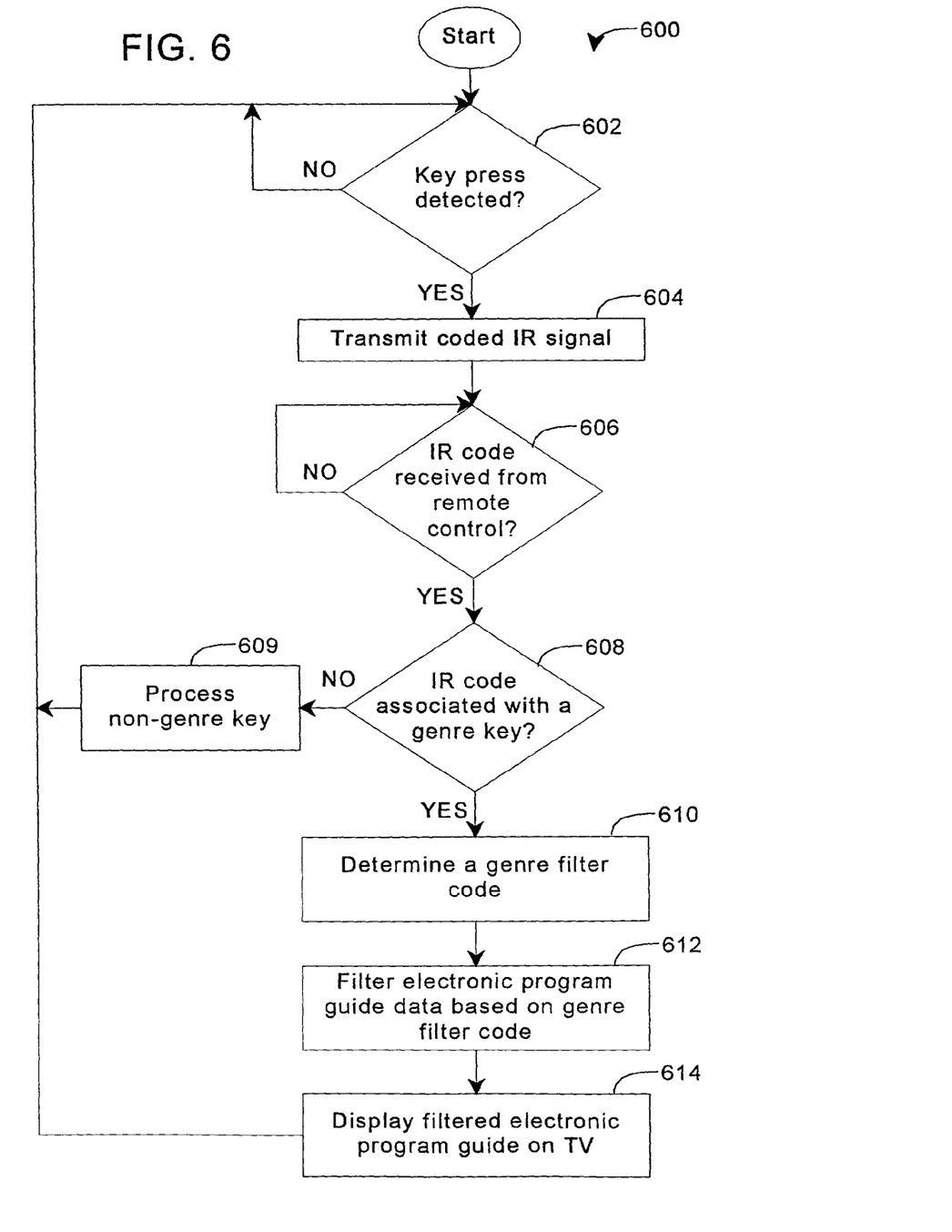
FIG. 6 is a flowchart of a program that can be implemented by the receiver station of FIG. 2 and the remote control unit of FIG. 3 to filter data displayed in the electronic program guide of FIG. 4.

A flowchart of a program 600 that can be implemented by the remote control unit 300 and the IRD 36 to filter data displayed in an electronic program guide 500 is illustrated in FIG. 6. Preferably, the steps are performed by the remote control unit controller 400 and the IRD controller 58. In general, the remote control unit 300 detects a key press and transmits an infrared signal 416 to the IRD 36. In response, the IRD 36 decodes the received infrared signal 416 and, if the signal 416 is associated with a genre key 302, the IRD 36 determines a genre filter code and displays a filtered electronic program guide 500 on the television screen.

The program 600 begins at step 602 by waiting for the detection of a key press at the remote control unit 300. Once a key press is detected, the program 600 transmits a coded infrared signal 416 (step 604). Preferably, the coded infrared signal 416 in indicative of a specific key press. For example, each key on the remote control unit 300 may be assigned a unique number known by the IRD 36. This number may then be encoded in the infrared signal 416 in a variety of known manners such as pulse code modulation. The IRD 36 waits for the infrared code at step 606. Once an infrared code is received, the IRD determines if the code is associated with a genre key (step 608). Preferably, this determination is accomplished by referencing a look up table in a known manner. If there is no entry in the look up table associated with the received code, the IRD 36 does not perform any filtering of the electronic program guide data, the non-genre key is processed in a known manner (step 609) and the process repeats at step 602.

However, if an entry associated with the received code is present in the look up table, a genre filter code is retrieved from the look up table (step 610). In an alternate embodiment, the received key code itself may serve as the genre filter code. Subsequently, the electronic program guide data is filtered based on the genre filter code (step 612). For example, header data associated with each packet of program guide data may include one or more genre codes which are then compared to the genre filter code. If a particular packet of electronic program guide data contains header data including a genre code that matches the genre filter code, then that packet may be included in the filtered electronic program guide data. Once the electronic program guide data is filtered, a filtered electronic program guide 500 may be displayed at step 614 (see FIG. 5).

In summary, persons of ordinary skill in the art will readily appreciate that a method and apparatus for filtering data displayed in an electronic television program guide has been provided. Users of satellite systems implementing the program guide filtering technique described herein teachings of the present invention can benefit from an electronic program guide which excludes undesired content from the program guide, thereby simplifying the process of selecting a desired channel.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for filtering data displayed in an electronic television program guide comprising the steps of:
   detecting a key press on a keypad associated with a television remote control unit;
   transmitting a signal indicative of the key press from the television remote control unit to an integrated receiver/decoder;
   identifying the key press as being associated with one of a plurality of genre keys, each genre key being a key on the television remote control unit, each of the plurality of genre keys associated with a genre;
   determining a genre filter code based on the signal indicative of the key press;
   filtering electronic program guide data based on the genre filter code to display only programs associated with the genre; and
   displaying the filtered electronic program guide data on a display screen.

2. The method of claim 1, wherein the step of identifying the key press as being associated with one of a plurality of genre keys comprises the step of determining if an entry associated with the signal is located in a look up table, the look up table being stored in a memory associated with the integrated receiver/decoder.

3. The method of claim 1, wherein the associated genre is selected from the group consisting of news, variety, music, family, living, movies, sports, Spanish, audio, and cinema.

4. The method of claim 1, wherein the step of determining a genre filter code comprises the step of retrieving the genre filter code from a look up table.

5. The method of claim 1, wherein the step of filtering electronic program guide data comprises the step of comparing the genre filter code to header information associated with a packet of electronic program guide data received by the integrated receiver/decoder from a direct-to-home television satellite.

6. A method for displaying a custom electronic television program guide comprising the steps of:
   detecting a key press on a keypad associated with a television remote control unit, the key press being associated with only one of a plurality of program genres;
   determining a genre filter code based on the detected key press;
   transmitting a signal indicative of the genre filter code;
   filtering electronic program guide data based on the genre filter code to include only programs associated with the one of the plurality of program genres associated with the key press; and
   displaying the filtered electronic program guide data on a display screen.

7. The method of claim 6, wherein the step of determining a genre filter code comprises the step of retrieving the genre filter code from memory.

8. The method of claim 6, wherein the step of filtering electronic program guide data comprises the step of comparing the genre filter code to header information associated with a packet of electronic program guide data.

9. The method of claim 8, further comprising the step of receiving the packet of electronic program guide data from a direct-to-home television satellite.

10. An apparatus for filtering data displayed in an electronic television program guide in a direct-to-home satellite television system, the apparatus comprising:

a receiver for receiving an infrared signal from a television remote control unit, the signal being indicative of a key press on a keypad associated with the television remote control unit;

a controller adapted to identify the signal as being associated with a genre key, a genre key being a key on the television remote control unit labeled with a genre identifier, the controller being further adapted to determine a genre filter code based on the signal, and to filter electronic program guide data received from a direct-to-home television satellite based on the determined genre filter code to include only electronic program guide data associated with programs of the identified genre; and an output driver for generating video signals for the electronic program guide on a television monitor.

11. The apparatus of claim 10, wherein the receiver is adapted to receive infrared signals.

12. The apparatus of claim 10, wherein the output driver is adapted to generate video signals compatible with a television.

13. A method of presenting an electronic television program guide, comprising the steps of:

receiving a signal indicative of a depression of one of a plurality of genre keys, each individual genre key of the plurality of genre keys associated with a genre of a program;

filtering electronic program guide data based on the genre associated with the depressed genre key; and providing the filtered electronic program guide data for display on a display screen.

14. The method of claim 13, wherein the provided filtered electronic program guide data comprises grid boxes associated with vertically listed channel numbers and horizontally listed program times.

15. The method of claim 13, wherein the step of receiving a signal indicative of a plurality of genre keys comprises the steps of:

receiving a genre filter code generated by a remote control unit in response to the depression of one of the plurality of genre keys, the genre filter code associated with the genre of the media program.

16. The method of claim 13, wherein the step of filtering electronic program guide data based on the genre associated with the depressed genre key comprises the steps of:

determining a genre filter code based on the signal indicative of the depression of the one of the plurality of genre keys;

filtering electronic program guide data based on the genre filter code to include only programs associated with the genre.

\* \* \* \* \*